(12) United States Patent
Knight (10) Patent No.: US 11,911,766 B2
(45) Date of Patent: *Feb. 27, 2024

(54) ASSEMBLIES FOR STORING SAMPLE PROCESSING

(71) Applicant: GEN-PROBE INCORPORATED, San Diego, CA (US)

(72) Inventor: Byron Knight, San Diego, CA (US)

(73) Assignee: GEN-PROBE INCORPORATED, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/392,208

(22) Filed: Aug. 2, 2021

(65) Prior Publication Data

US 2022/0023866 A1    Jan. 27, 2022

Related U.S. Application Data

(63) Continuation of application No. 15/487,072, filed on Apr. 13, 2017, now Pat. No. 11,179,726.

(Continued)

(51) Int. Cl.
*B01L 3/00* (2006.01)
*B01L 9/06* (2006.01)
(Continued)

(52) U.S. Cl.
CPC .......... *B01L 3/527* (2013.01); *B01L 3/50853* (2013.01); *B01L 9/06* (2013.01); *B01L 9/523* (2013.01);
(Continued)

(58) Field of Classification Search
CPC .......... B01L 2200/025; B01L 2300/02; B01L 2300/022; B01L 2300/041;
(Continued)

(56) References Cited

U.S. PATENT DOCUMENTS

| 3,491,894 A | 1/1970 | Brown |
| 4,948,564 A | 8/1990 | Root et al. |
| 4,963,493 A | 10/1990 | Daftsios |

(Continued)

OTHER PUBLICATIONS

CNIPA First Office Action, Chinese Patent Application No. 201780023461.2, dated Jul. 1, 2020.

(Continued)

*Primary Examiner* — Robert F Long
*Assistant Examiner* — Xavier A Madison
(74) *Attorney, Agent, or Firm* — Sterne, Kessler, Goldstein & Fox P.L.L.C.; John D. Higgins; Charles B. Cappellari (57) ABSTRACT

An assembly for storing sample processing consumables that includes a cover and a tray. The cover includes a flexible panel and a cover wall that extends downward from the perimeter of the panel, where the panel and the cover wall define a cavity. The tray has a top surface that defines a plurality of wells and a side surface that extends downward from the perimeter of the top surface. The panel is situated adjacent the top surface of the tray, where a first portion of the tray is received within the cover cavity, such that a press fit is formed between the side surface of the tray and an inner surface of the cover wall, thereby releasably coupling the cover to the tray. At least a portion of the wells contain a sample processing consumable, and the cover is configured to be decoupled from the tray by applying a force to the panel to overcome the press fit.

19 Claims, 7 Drawing Sheets

Related U.S. Application Data (60) Provisional application No. 62/322,491, filed on Apr. 14, 2016.

(51) Int. Cl.
    *B01L 9/00* (2006.01)
    *B65D 25/10* (2006.01)
    *B65D 43/02* (2006.01)
    *G01N 35/04* (2006.01)
    *G01N 35/00* (2006.01)

(52) U.S. Cl.
    CPC ............ *B01L 9/543* (2013.01); *B65D 25/108* (2013.01); *B65D 43/0202* (2013.01); *B01L 2200/025* (2013.01); *B01L 2300/02* (2013.01); *B01L 2300/022* (2013.01); *B01L 2300/041* (2013.01); *B01L 2300/047* (2013.01); *B01L 2300/048* (2013.01); *B01L 2300/0609* (2013.01); *B01L 2300/0809* (2013.01); *B01L 2300/0829* (2013.01); *B01L 2300/0858* (2013.01); *B65D 2543/00444* (2013.01); *B65D 2543/00935* (2013.01); *G01N 2035/00792* (2013.01); *G01N 2035/0403* (2013.01)

(58) Field of Classification Search
    CPC ........... B01L 2300/047; B01L 2300/48; B01L 3/527; B01L 3/50853; B01L 9/06; B01L 9/543; B01L 2300/0829; B65D 25/105; B65D 43/0202; B65D 25/0108; G01N 2035/0403
    USPC ............................... 422/522; 211/74; 53/492
    See application file for complete search history.

(56) References Cited

U.S. PATENT DOCUMENTS

| | | | |
|---|---|---|---|
| 5,366,088 A * | 11/1994 | Hill | B01L 9/543 422/933 |
| 5,801,055 A * | 9/1998 | Henderson | B01L 3/50255 435/297.5 |
| 6,171,554 B1 * | 1/2001 | Kalmakis | B01L 9/06 206/443 |
| 6,258,325 B1 | 7/2001 | Sanadi | |
| 6,328,933 B1 * | 12/2001 | Labriola | B01L 9/543 211/74 |
| 9,597,689 B2 * | 3/2017 | Link | B01L 9/06 |
| 2002/0189374 A1 | 12/2002 | DeSilets et al. | |
| 2004/0089615 A1 | 5/2004 | Weiss et al. | |
| 2004/0265186 A1 | 12/2004 | Clark et al. | |
| 2005/0082243 A1 * | 4/2005 | Lahti | B01L 9/543 211/74 |
| 2005/0236346 A1 | 10/2005 | Whitney | |
| 2008/0124250 A1 * | 5/2008 | Yang | G01N 35/1065 422/400 |
| 2009/0293643 A1 * | 12/2009 | Powell | B01L 9/543 206/505 |
| 2014/0234182 A1 * | 8/2014 | Motadel | B01L 9/543 422/526 |
| 2018/0149670 A1 | 5/2018 | Bork | |
| 2019/0240656 A1 * | 8/2019 | Sim | B01L 9/523 |
| 2022/0016634 A1 * | 1/2022 | Lacey | B01L 9/543 |

OTHER PUBLICATIONS

CNIPA Search Report, Chinese Patent Application No. 201780023461.2, dated Jun. 23, 2020.

EPO Communication Pursuant to Article 94(3) EPC, EP Patent Application No. 17735251.5, dated Oct. 29, 2019.

PCT, International Search Report and Written Opinion, International Patent Application No. PCT/US2017/027420, dated Sep. 22, 2017.

PCT, International Preliminary Report on Patentability, International Patent Application No. PCT/US2017/027420, dated Oct. 25, 2018.

\* cited by examiner

ASSEMBLIES FOR STORING SAMPLE PROCESSING

CROSS-REFERENCE TO RELATED APPLICATION

This application is a Continuation of U.S. application Ser. No. 15/487,072, filed Apr. 13, 2017, now U.S. Pat. No. 11,179,726, which claims the benefit of U.S. Provisional Application No. 62/322,491, filed Apr. 14, 2016, each of which applications is hereby incorporated by reference herein.

BACKGROUND

Field

Embodiments of this disclosure relate to assemblies for storing sample processing consumables and sample processing instruments, and methods for loading sample processing consumables into sample processing instruments.

Background

Consumables can be used with sample processing instruments. These consumables include, for example, as receptacles, caps for closing receptacle openings, pipette tips, and containers storing reagents are used during processing of a sample. These consumable can also include, for example, components used to maintain sample processing instruments such as cleaning tools used to clean the ends of optical fibers. These consumables can be stored and packaged on a tray wrapped with shrink-wrap or lined with a peelable film to secure the consumables on the tray. Or these consumables can also be stored on tray having a rigid plastic cover, and the cover can be secured to the tray using a cardboard sleeve or box surrounding the cover and the tray.

The tray storing the consumables can be loaded into a sample processing instrument for use during sample processing. During this loading process, the shrink-wrap or peelable film is removed from the tray to provide instrument access to the consumables. Removing the shrink wrap or peelable film from the tray can require substantial user handling of the tray. For example, removing the shrink wrap or peelable film typically requires two hands, and the tray is often rotated and turned upside down. These handling requirements can increase the time it takes to load consumables into the sample processing instrument, increase the risk that the consumable will be spilled from the tray, and increase the risk of contamination of the consumables. Shrink-wrap and peelable films can also be cumbersome to tear and remove. Moreover, shrink-wrap and peelable films can generate undesirable static electricity.

Accordingly, there is a need for a sample processing consumable tray that can be efficiently and sterilely loaded into a sample processing instrument.

SUMMARY

In some embodiments, an assembly for storing sample processing consumables includes a cover defining a cover cavity. The assembly also includes a tray. The tray defines a first plurality of wells. The tray includes a first portion received within the cover cavity such that a press fit is formed between a first tray surface of the first portion of the tray and a first cover surface of the cover defining the cover cavity, thereby releasably coupling the cover to the tray. Each of the first plurality of wells contains a sample processing consumable.

The cover can be configured to be decoupled from the tray by applying a force to a panel of the cover to overcome the press fit. The panel can be adjacent a second tray surface of the tray defining openings of the first plurality of wells. The panel can be spaced apart from the second tray surface, or the panel can contact the second tray surface.

The cover can also include a cover wall extending from a perimeter of the panel, and the cover wall can include the first cover surface. The cover wall can define a hollow protrusion configured to prevent a vacuum from forming in the cover cavity when the first portion of the tray is received therein. The cover can be configured such that the cover wall remains stationary as the cover is decoupled from the tray by applying the force to the panel.

The cover can also include a flange extending outward from the cover wall. The flange can extend from a distal end of the cover wall. The panel, the cover wall, and the flange can be configured such that, when the tray is aligned with a support cavity defined by a support wall of a support, the flange contacts the support wall. The tray and the cover can be configured such that, when the flange contacts the support wall, the tray is spaced apart from a support base of the support further defining the support cavity.

The cover wall can have a cover dimension between the panel and the flange, and the tray can have a tray dimension between a bottom of the tray and the second tray surface. The tray dimension can be greater than the cover dimension such that a second portion of the tray extends beyond the flange in a direction away from the panel.

The support can be part of an instrument configured to perform an assay for determining the presence of an analyte in a sample. The support can be part of a drawer of the instrument. The support can be part of an instrument configured to perform sample preparation.

The first plurality of wells can contain a single type of sample processing consumable in some embodiments. The first plurality of wells contain at least a first type of sample processing consumable and a second type of sample processing consumable different than the first type of sample processing consumable in some embodiments. The sample processing consumable can be a receptacle, a cap for closing an opening of a receptacle, a pipette tip, a reagent container, or a cleaning member configured to clean or sterilize a component of a sample processing instrument.

The first plurality of wells can include a first subset of wells containing a first type of sample processing consumable, and a second subset of wells configured differently than the first subset of wells and containing a second type of sample processing consumable. The panel of the cover can define a plurality of protrusions configured to extend into portions of the second subset of wells.

The cover can be thermoformed. The assembly can be void of shrink-wrap. The tray can also define a second plurality of wells that do not contain sample processing consumables.

In some embodiments, a sample processing instrument is provided that includes a support. The support defines a support cavity receiving a tray. The tray stores a plurality of sample processing consumables for sample processing. A first portion of the tray is received within a cover cavity defined by a cover. A press fit is created between a first tray surface of the tray and a first cover surface of the cover defining the cover cavity, thereby releasably coupling the cover to the tray. The support, the tray, and the cover are configured such that, when a force is applied to a panel of the cover that overcomes the press fit, the tray is decoupled from the cover and seated in the support cavity.

The cover can also include a cover wall extending from a perimeter of the panel and a flange extending outward from the cover wall. The cover wall can include the first cover surface. The support can include a support base and a support wall extending from the support base. The support base and the support wall define the support cavity. The support, the tray, and the cover can be configured such, when the tray is aligned with the support cavity, the flange contacts the support wall.

The support, the tray, and the cover can be configured such that, when the flange contacts the support wall, the tray is spaced apart from the support base before any force is applied to the panel to overcome the press fit. The tray and the cover can be configured such that, when coupled together, a second portion of the tray extends beyond the flange and into the support cavity.

The tray can store a single type of sample processing consumable in some embodiments. The sample processing consumable can be a receptacle, a cap for closing an opening of a receptacle, a pipette tip, a reagent container, and a cleaning member configured to clean or sterilize a component of a sample processing instrument. The tray can store a first type of sample processing consumable and a second type of sample processing consumable different than the first type of sample processing consumable in some embodiments.

The sample processing instrument can be configured to perform an assay for determining the presence of an analyte in a sample. The sample processing instrument can be configured to perform sample preparation.

A method of loading consumables into a sample processing instrument is provided that includes aligning a tray with a support cavity defined by a support of the sample processing instrument. The tray stores sample processing consumables. The method also includes contacting a flange with a portion of the support. The flange extends outward from a wall of a cover coupled to the tray. The method also includes decoupling the cover from the tray by pressing a panel of the cover. The method also includes seating the tray in the support cavity.

The support can include a support base and a support wall extending from the base. The support base and the support wall can define the support cavity, and the support wall can include the portion of the support the flange contacts.

Aligning the tray with the support cavity can include inserting a portion of the tray extending beyond a cover cavity defined by the cover into the support cavity. Decoupling the cover from the tray and seating the tray in the cavity can occur simultaneously.

The method can also include removing, after decoupling the cover from the tray, the cover from the sample processing instrument.

The sample processing instrument can be configured to perform an assay for determining the presence of an analyte in a sample. The sample processing instrument is can be configured to perform sample preparation.

The sample processing consumables can be receptacles, caps for closing openings of the receptacles, pipette tips, reagent containers, and cleaning members configured to clean or sterilize a component of a sample processing instrument.

Seating the tray in the cavity can include dropping the tray into the support cavity.

Decoupling the cover from the tray by pressing the panel can include applying a force that overcomes a press fit formed between the cover and the tray.

In some embodiments, a method of loading consumables into a sample processing instrument includes aligning a tray with a cavity defined by a support of the sample processing instrument. The tray stores consumables and is coupled to a cover. The method also includes decoupling the cover from the tray by pressing a panel of the cover. The method also includes generating sensory feedback when the cover is decoupled from the tray, and seating the tray in the cavity defined by the support of the sample processing instrument.

The sensory feedback can include tactile feedback, audible feedback, and visual feedback. The tactile feedback can be generated by overcoming a press fit between the cover and the tray. The audible feedback can be generated by bending of the panel of the cover.

Decoupling the cover from the tray and generating sensory feedback can occur simultaneously. Decoupling the cover from the tray and seating the tray in the cavity can occur simultaneously.

Further features and advantages of the embodiments, as well as the structure and operational of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

DESCRIPTION OF THE DRAWINGS

The accompanying drawings, which are incorporated herein and form a part of the specification, illustrate the embodiments and, together with the description, further serve to explain the principles of the embodiments and to enable a person skilled in the relevant art(s) to make and use the embodiments.

The features and advantages of the embodiments will become more apparent from the detailed description set forth below when taken in conjunction with the drawings, in which like reference characters identify corresponding elements throughout.

DETAILED DESCRIPTION

The present disclosure will now be described in detail with reference to embodiments thereof as illustrated in the accompanying drawings. References to "one embodiment," "an embodiment," "some embodiments," "an exemplary embodiment," "for example," "an example," "exemplary," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, "a" or "an" means "at least one" or "one or more."

As used herein, a "sample processing instrument" refers to any instrument capable of performing a processing step on a sample contained within a receptacle. A sample processing instrument includes any instrument capable of performing an assay on a sample and rendering a result. For example, a sample processing instrument includes any instrument capable performing an assay on a sample to determine the presence of an analyte in the sample. Any instrument capable of performing a hybridization assay, a molecular assay including a nucleic-acid-based amplification reaction, a sequencing assay, an immunoassay, or chemistry assay on a sample is included in this definition of a sample processing instrument. Exemplary sample processing instruments instrument capable performing an assay on a sample to determine the presence of an analyte in the sample include the Tigris® and Panther® systems sold by Hologic, Inc., Bedford, MA, as well as any of the diagnostic instruments disclosed in U.S. Patent Application Publication No. 2016/0060680, published Mar. 3, 2016. A sample processing instrument also includes any instrument that only performs sample preparation steps and is not capable of analyzing a sample and/or rendering a result. For example, an instrument that transfers a sample from one receptacle to another receptacle or adds one substance to a receptacle containing a sample, but does not perform an assay on the sample, is a sample processing instrument. And, for example, an instrument that only performs sample preparation steps to isolate and/or purify an analyte of interest is a sample processing instrument. An exemplary sample processing instrument that only performs sample preparation steps is the Tomcat® system sold by Hologic, Inc., Bedford, MA.

As used herein, a "sample" refers to any material to be analyzed, regardless of the source. The material may be in its native form or any stage of processing (e.g., the material may be chemically altered or it may be one or more components of a sample that have been separated and/or purified from one or more other components of the sample). A sample may be obtained from any source, including, but not limited to, an animal, environmental, food, industrial or water source. Animal samples include, but are not limited to, peripheral blood, plasma, serum, bone marrow, urine, bile, mucus, phlegm, saliva, cerebrospinal fluid, stool, biopsy tissue including lymph nodes, respiratory tissue or exudates, gastrointestinal tissue, cervical swab samples, semen or other body or cellular fluids, tissues, or secretions. Samples can be diluted or contained within a receptacle containing diluents, transport media, preservative solution, or other fluids. As such, the term "sample" is intended to encompass samples contained within a diluent, transport media, and/or preservative or other fluid intended to hold a sample.

As used herein, a "sample processing consumable" is any consumable intended to be used with a sample processing instrument. Exemplary sample processing consumables include, but are not limited to, receptacles, caps for closing openings of receptacles, pipette tips, and reagent containers. Exemplary sample processing consumables also include any consumable intended to be used to maintain the sample processing instrument. Exemplary maintenance sample processing consumables include, but are not limited to, members configured to clean and/or sterilize various components of the sample processing instrument, such as optical elements, test receptacle wells, and any other components of a sample processing instrument. For example, maintenance sample processing consumables include any of the cleaning members (such as cleaning members made of a material that generates static attraction, or cleaning members made of absorbent material capable of retaining a cleaning fluid or sterilizing substance) as disclosed in U.S. Provisional Application No. 62/145,247, filed Apr. 9, 2015.

As used herein, a "press fit" refers to a releasable coupling of two separate components by friction at an interface between surfaces of the components. A press fit does not include a snap fit in which separate components are coupled together by interlocking surfaces such as complementary flanges, ridges, or grooves.

In some embodiments, an assembly for storing sample processing consumables includes a tray that stores a plurality of sample processing consumables, and a cover that secures the consumables on the tray. The cover can also prevent contamination of the consumables. The cover can be releasably coupled to the tray by a press fit in some embodiments. The press fit can allow a user to easily and quickly decouple the cover from the tray when loading the tray into a sample processing instrument. For example, the cover can be decoupled from the tray using only one hand and with minimal handling of the assembly. Such a configuration can minimize the amount of user handling required to load the tray into a sample processing instrument.

FIGS. 1 and 3-5 illustrate an assembly 100 according to an embodiment. Assembly 100 includes a cover 102 and a tray 104. Cover 102 is releasably coupled to tray 104 by a press fit.

Tray 104 is configured to store a plurality of sample processing consumables. Exemplary types of sample processing consumables include, but are not limited to, receptacles, caps for closing openings of receptacles, pipette tips, and reagent containers. Tray 104 can be configured to store other types of sample processing consumables.

Tray 104 can define a plurality of wells 106 each configured to receive one or more sample processing consumables. In some embodiments, each well of the plurality of wells 106 is configured to receive only one sample processing consumable. In other embodiments, each well of the plurality of wells 106 is configured to receive more than one, for example, two or three, sample processing consumables.

In some embodiments, each of the plurality of wells 106 is configured (for example, shaped and sized) to contain a single type of sample processing consumable. For example, each of the plurality of wells 106 is configured to contain a receptacle, or each of the plurality of wells 106 is configured to contain a pipette tip.

Figure 1:
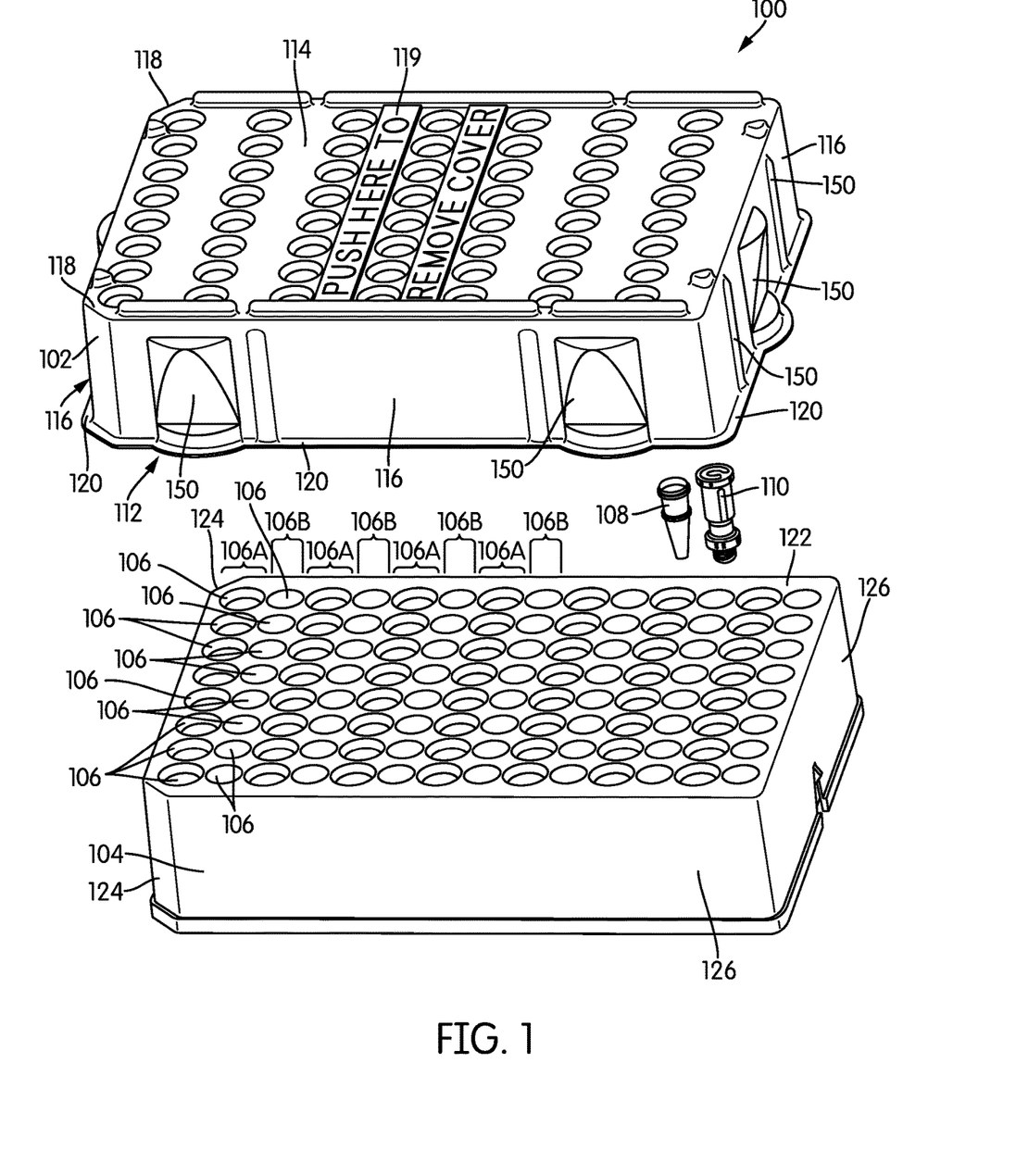
FIG. 1 is an exploded perspective view of an assembly having a cover and a tray for storing sample processing consumables, according to an embodiment.
Figure 5:
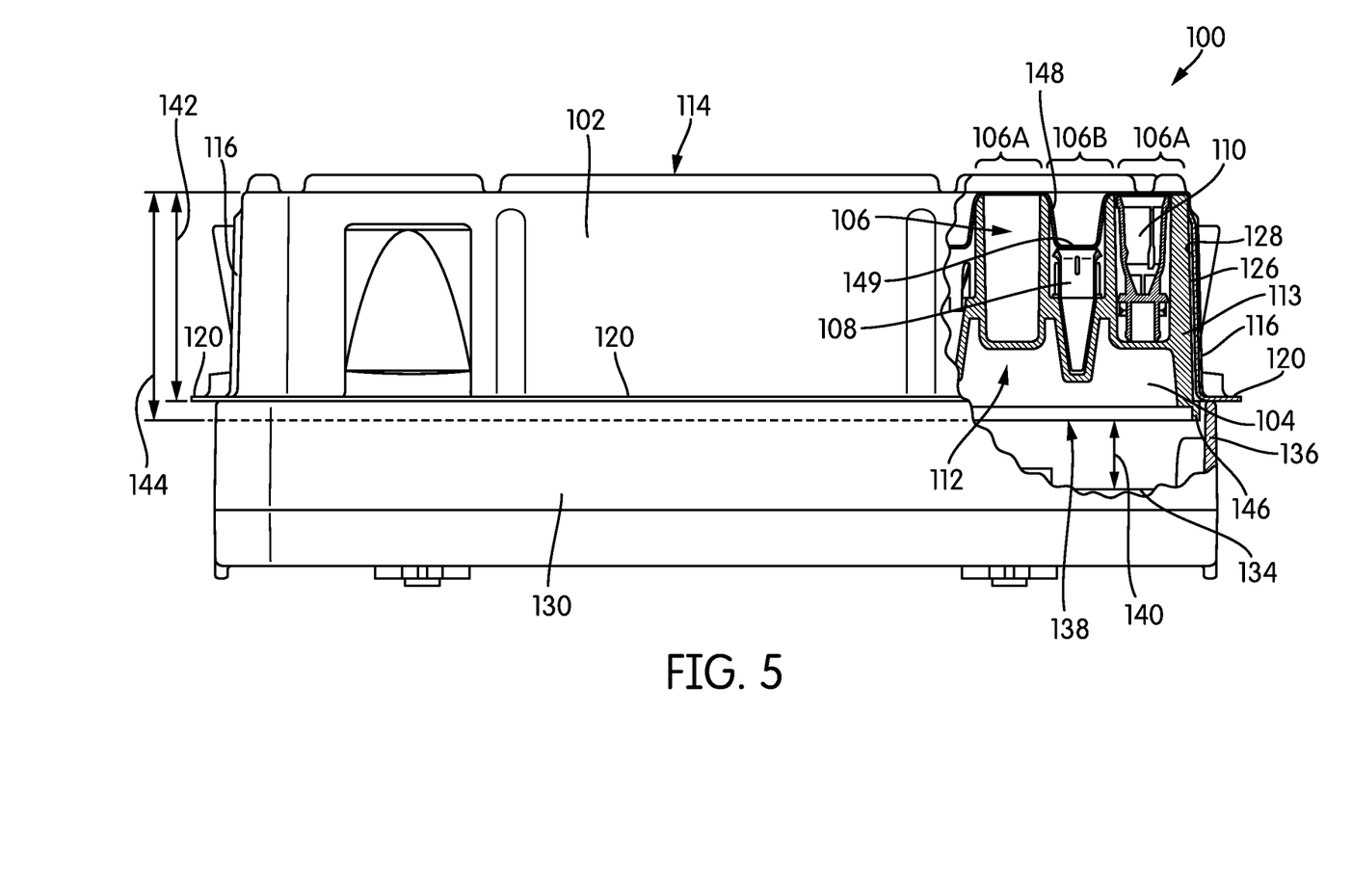
FIG. 5 is a side view of the assembly of FIGS. 1 and 3 and the support of FIG. 4 with a partial cross-sectional view, according to an embodiment.

In other embodiments, the plurality of wells 106 are configured to contain different types of sample processing consumables. For example, the plurality of wells 106 contains both receptacles and caps for closing the openings of the receptacles, or the plurality of wells 106 contain pipette tips and reagent containers. In such embodiments, the plurality of wells 106 can include two or more subsets of wells 106, and each subset of wells 106 is configured (for example, shaped and sized) to contain a different type of sample processing consumable. For example, as shown in FIG. 1, the plurality of wells 106 can include a first subset 106A of wells 106 configured to contain a first type of sample processing consumable, and a second subset 106B of wells 106 configured to contain a different type of sample processing consumable. In some embodiments, wells 106 of first subset 106A are shaped and sized differently than wells 106 of subset 106B. For example, as best seen in FIG. 5, wells 106 of subset 106A are generally cylindrical, and wells 106 of subset 106B include an upper generally cylindrical portion and a lower conical portion. Wells 106 of subset 106A and subset 106B can have other suitable shapes.

In some embodiments as shown in FIG. 1, wells 106 of first subset 106A can each be configured to contain a receptacle 108, and wells 106 of second subset 106B can be can each be configured to contain a cap 110 that is configured to close the opening of receptacle 108. In other embodiments, wells 106 of first and second subsets 106A and 106B are configured to contain types of sample processing consumables other than receptacles 108 and caps 110, for example, pipette tips, and reagent containers.

In some embodiments, wells 106 are sized such that the entire consumable (for example, receptacle 108 or cap 110) fits within a respective well 106, as shown in FIG. 5. In such embodiments, consumables 108 and 110 do not extend above a top surface of tray 104 (for example, a surface 122 described further below), and do not extend below a bottom surface of tray 104 (for example, a surface 138 described further below).

In some embodiments, receptacles 108 are configured to receive and store fluid samples for subsequent analysis, including analysis with nucleic acid-based assays or immunoassays diagnostic for a particular analyte. Receptacle 108 can be a single-piece receptacle that includes a generally cylindrical upper portion and a tapered lower portion. The upper portion has an opening through which fluid samples can be deposited or removed from receptacle 108. The tapered lower closed portion can be either flat or rounded to provide optical communication with an optical system, for example, one or more optical fibers (not shown) of a biochemical analyzer such as those disclosed in U.S. Patent Application Publication No. 2014/0263984, published Sep. 18, 2014. Exemplary receptacles 108 include any of the receptacles disclosed in U.S. Pat. No. 9,162,228, issued Oct. 20, 2015. In some embodiments, caps 110 include a lower portion having an outer surface for sealing engagement of an inner surface of the upper portion of receptacle 108, and caps 110 can include an upper portion. The upper portion of cap 110 can include an opening for frictional attachment to a portion of a receptacle transport mechanism, such as a tubular probe of a pipettor or a pick-and-place robotic arm. Exemplary caps 110 include any of the caps disclosed in U.S. Pat. No. 9,162,228, issued Oct. 20, 2015.

Tray 104 can include a surface 122 defining the openings of the plurality of wells 106. Surface 122 is positioned at the top of tray 104 in some embodiments as shown in FIG. 1. In some embodiments, surface 122 is substantially rectangular when viewed from above as shown in FIG. 1. The substantially rectangular shape of surface 122, when viewed from above, can have tapered corners 124 (which can correspond to tapered corners 137 of a cavity 132 defined by a support 130 as shown, for example, in FIG. 4) in some embodiments. In some embodiments, the asymmetric shape of tray 104 about the minor axis of tray 104 (and corresponding asymmetric shape of cavity 132 formed by tapered corners 124) ensures that tray 104 is properly oriented within the cavity defined by the support, which as described further below.

Tray 104 can be a substantially rectangular prism, as shown in FIG. 1, in some embodiments. In other embodiments, tray 104 can have other suitable shapes, such as circular, square, or any other suitable shape.

In some embodiments, tray 104 includes a surface 126 extending from surface 122. Surface 126 can extend from the perimeter of surface 122 in a downward direction. Surface 126 can overlap wells 106 in a vertical direction in some embodiments as shown in FIG. 1. In some embodiments, surface 126 surrounds the entire perimeter of surface 122 as shown in FIG. 1. In other embodiments, surface 126 surrounds only a portion of the perimeter of surface 122. Surface 126 can be plane in the substantially vertical direction as shown in FIG. 1. In some embodiments, surface 126 is perpendicular to surface 122. In other embodiments, surface 126 forms an oblique or acute angle with surface 122.

Tray 104 can be made of any suitable plastic material in some embodiments. In other embodiments, tray 104 can be made of any suitable metal material, for example, stainless steel.

Figure 2:
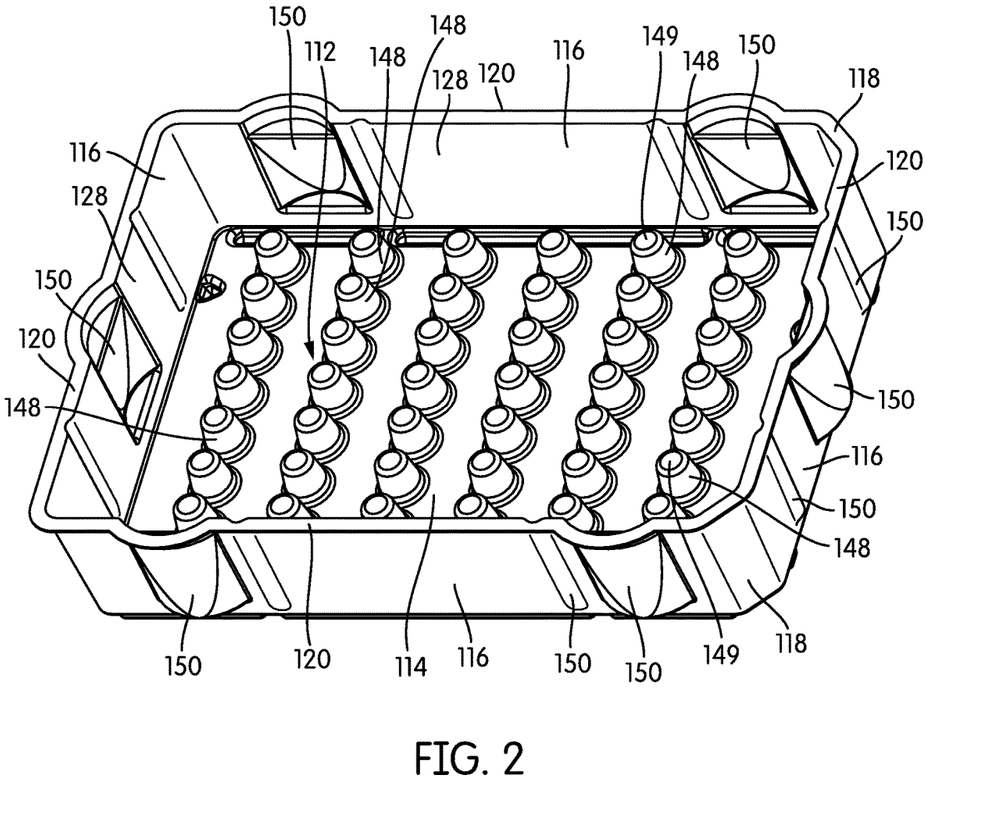
FIG. 2 is a perspective view of the cover of FIG. 1, according to an embodiment.
Figure 3:
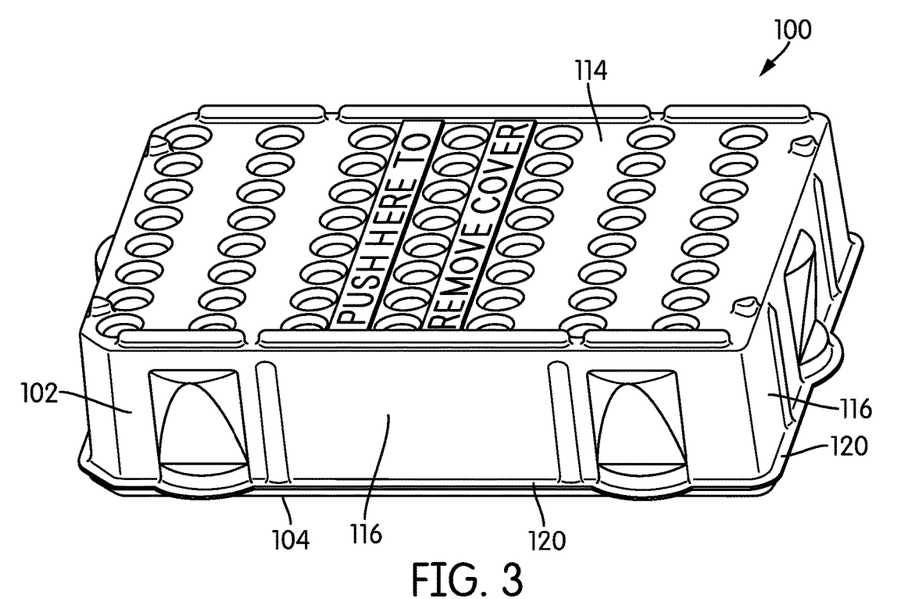
FIG. 3 is a perspective view of the assembly of FIG. 1 with the cover coupled to the tray, according to an embodiment.

Turning to cover 102, cover 102 defines a cavity 112 configured to receive at least a portion 113 of tray 104, as best seen in FIG. 2. Portion 113 of tray 104 can be an upper portion of tray 104, as shown in FIG. 5, in some embodiments. Cavity 112 is shaped and sized such that, when portion 113 is received within cavity 112, a press fit is formed between cover 102 and tray 104, thereby releasably coupling cover 102 to tray 104. For example, tray 104 and cover 102 can include surfaces that engage one another to form the press fit when portion 113 of tray 104 is received within cavity 112. As shown in FIG. 5, wall 116 includes an inner surface 128, and a press fit can be formed at the interface between inner surface 128 of wall 116 and surface 126 of tray 104 when portion 113 of tray 104 is received within cavity 112. In such embodiments, cover 102 and tray 104 are coupled by a press fit, not a snap fit. In some embodiments, the interface forming the press fit, for example, between (a) surface 128 of wall 116 and (b) surface 126 of tray 104, extends around substantially the entire perimeter of cover 102 and tray 104. In other embodiments, the interface forming the press fit extends around only a portion or portions of the perimeter of cover 102 and tray 104.

In some embodiments, cover 102 includes a panel 114 and a wall 116 extending therefrom. Panel 114 and wall 116 collectively define cavity 112 of cover 102. Cavity 112 can have a shape and size that closely corresponds to the shape and size of tray 104. For example, tray 104 is a substantially rectangular prism, as shown in FIG. 1, and cavity 112 is a substantially rectangular prism, as show in FIG. 2, in some embodiments.

Wall 116 extends downward from the perimeter of panel 114. In some embodiments, wall 116 surrounds the entire perimeter of panel 114, as shown in FIG. 1. In other embodiments, wall 116 surrounds only a portion of the perimeter of panel 114.

Panel 114 of cover 102 can form the top of cover 102 in some embodiments, as shown in FIG. 1. In other embodiments, panel 114 can be positioned at an intermediate position of cover 102. In some embodiments, panel 114 can be substantially rectangular when viewed from above, as shown in FIG. 1. The substantially rectangular shape of panel 114, when viewed from above, can have tapered corners 118 (which can correspond to tapered corners 124 of tray 104) in some embodiments.

Cover 102 can be configured to be decoupled from tray 104 by applying a force to a location on panel 114 of cover 102 that overcomes the press fit between cover 102 and tray 104. In some embodiments, the location where the force is applied is at a center of panel 114. Panel 114 can include indicia 119 that indicate to a user where to apply the force. Indicia 119 can be text (e.g., "PUSH HERE TO REMOVE COVER," as shown in FIG. 1) or symbols (e.g., a graphical representation of one or more fingers pushing on a surface). When a user applies a force to panel 114, panel 114 flexes, which transfers the applied force to tray 104 and causes tray 104 to move relative to cover 102 as described in more detail below. In some embodiments, an audible noise is generated when panel 114 flexes.

In some embodiments, the magnitude of the force required to overcome the press fit between cover 102 and tray 104 is greater than the weight of tray 104. In such embodiments, tray 104 will not fall out of cavity 112 of cover 102 on its own—due to the force of gravity acting on tray 104. In some embodiments, the magnitude of the force required to overcome the press fit between cover 102 and tray 104 is such that a user can easily decouple tray 104 from cover 102, for example, by the push of a finger or two on panel 114 of cover 102. In some embodiments, the magnitude of force required to overcome the press fit between cover 102 and tray 104 can be in the range from about 1 N to about 15 N. For example, the required force magnitude can be in the range from about 3 N to about 11 N. In some embodiments, the required force magnitude can be at least 3 N.

Cover 102 can be configured such that wall 116 remains substantially stationary as cover 102 is decoupled from tray 104 by applying a force to panel 114 in some embodiments. That is, when a force is applied to panel 114 to overcome the press fit, wall 116 do not substantially deflect outward or inward relative to panel 114. The orientation of wall 116 relative to panel 114 stays substantially the same. Accordingly, cover 102 can be decoupled from tray 104 without wall 116 substantially deflecting relative to panel 114.

In other embodiments, cover 102 can be configured such that wall 116 bows slightly inward or outward as cover 102 is decoupled from tray 104.

Referring to FIG. 5, when cover 102 is releasably coupled to tray 104, panel 114 is adjacent surface 122 of tray 104 defining the openings of the plurality of wells 106 such that consumables 108 and 110 contained within wells 106 cannot fall out of wells 106, even when tray 104 is inverted, such that the openings of wells 106 face downward. In some embodiments, panel 114 is adjacent surface 122 of tray 104, such that panel 114 is spaced apart from surface 122 of tray 104. In other embodiments, panel 114 is adjacent surface 122 of tray 104 such that panel 114 contacts surface 122 of tray 104. In some embodiments, panel 114 can also include a plurality of protrusions 148 configured to extend into at least some of the plurality of wells 106 when cover 102 is coupled to tray 104. For example as best seen in FIG. 5, panel 114 can include a plurality of protrusions 148 configured to extend into each well 106 of second subset 106B that contains a consumable, for example, a receptacle 108. Each protrusion 148 can have a trough 149 configured to be adjacent (e.g., contacting or near but spaced apart from) a respective top portion of consumable 108. Trough 149 being adjacent the consumable 108 in well 106 substantially prevents movement of consumable 108 within well 106.

Wall 116 can define one or more hollow protrusions 150. Hollow protrusions 150 are configured to prevent a vacuum from forming in cavity 112 of cover 102 when portion 113 of tray 104 is received within cavity 112. Preventing a vacuum from forming in cavity 112 helps ensure that cover 102 can be easily decoupled from tray 104 by pressing panel 114.

Cover 102 includes a flange 120 extending outward from wall 116 in some embodiments. As shown in FIG. 1, flange 120 extends from a distal end of wall 116. In other embodiments, flange 120 extends from an intermediate portion of wall 116. In some embodiments, flange 120 surrounds around the entire perimeter of wall 116 as shown in FIG. 1. In other embodiments, flange 120 surrounds only a portion of the perimeter of wall 116. As shown in FIG. 5, the cover can have a dimension 142 between panel 114 and flange 120. In some embodiments, dimension 142 is about 20 mm to about 40 mm. For example, dimension 142 can be about 30 mm. In some embodiments, dimension 142 is large enough such that a user can place substantially the entire user's thumb and finger tips on wall 116 while handling assembly 100.

Figure 4:
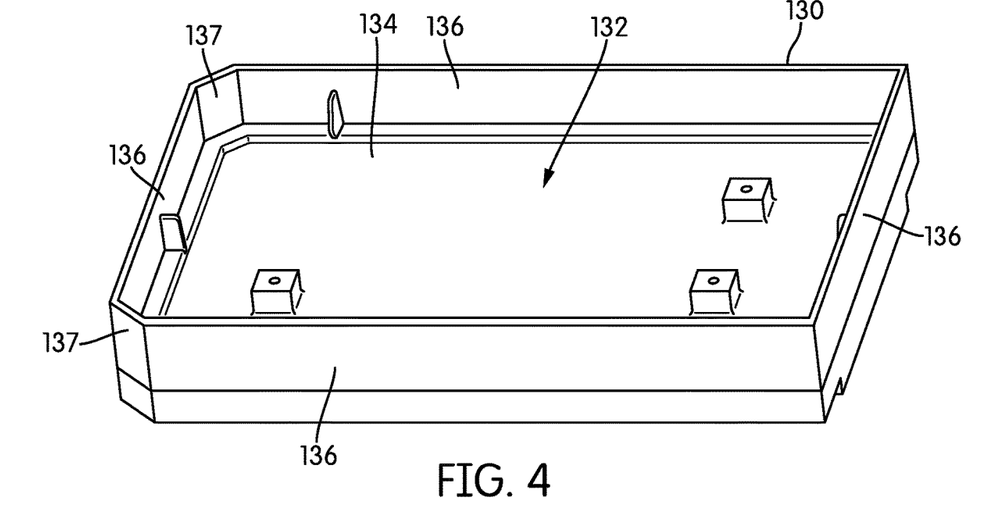
FIG. 4 is a perspective view of a support, according to an embodiment.

In some embodiments, a portion of tray 104 is configured to be received within a cavity defined by a support 130. FIG. 4 illustrates support 130 according to an embodiment. In some embodiments, support 130 is part of a sample processing instrument. That is, the sample processing instrument can store sample processing consumables, for example, within the housing of the processing instrument, using support 130. For example, support 130 may be part of an instrument configured to perform an assay for determining the presence of an analyte in a sample. For example, support 130 may be part of the Tigris® and Panther® systems sold by Hologic, Inc., Bedford, MA, and for example, support 130 may be part of any of the diagnostic instruments disclosed in U.S. Patent Application Publication No. 2016/0060680, published Mar. 3, 2016. In some embodiments, support is part of an instrument configured to perform only sample preparation on samples contained in receptacles, and not to perform an assay for determining the presence of an analyte in a sample. For example, support 130 may be part of an instrument similar to the Tomcat® system sold by Hologic, Inc., Bedford, MA.

In some embodiments, support 130 is part of a drawer or sliding surface of a sample processing instrument. In such embodiments, support 130 moves along with the drawer or sliding surface.

Support 130 defines a cavity 132 configured to receive at least a portion (e.g., the lower portion) of tray 104. Support 130 includes a base 134 and a wall 136 extending upward from the perimeter of base 134. Base 134 and wall 136 collectively define cavity 132 of support 130. In some embodiments, wall 136 surrounds the entire perimeter of base 134 as shown in FIG. 4. In other embodiments, wall 136 surrounds only a portion of the perimeter of base 134. In some embodiments, base 134 is substantially planar in the horizontal direction as shown in FIG. 4. In some embodiments, wall 136 is substantially planar in the vertical direction as shown in FIG. 4.

In some embodiments, base 134 has a substantially rectangular shape, when viewed from above, as shown in FIG. 4. And, as shown in FIG. 4, support 130 can have tapered corners 137 (which can correspond to tapered corners 124 of tray 104, as shown in FIG. 1) in some embodiments. In some embodiments, the asymmetric shape of support 130 and cavity 132 about the minor axis of support 130 (and corresponding asymmetric shape of tray 104) formed by tapered corners 137 ensures that tray 104 is properly oriented within cavity 132 defined by support 130.

Panel 114, wall 116, and flange 120 can be configured such that, when tray 104 is aligned with cavity 132 defined by support 130, a portion 146 of tray 104 is inserted within cavity 132, flange 120 contacts wall 136 of support 130, as shown in FIG. 5. When flange 120 contacts wall 136 of support 130, a bottom surface 138 of tray 104 is spaced apart from base 134 of support 130 by a gap 140. In some embodiments, gap 140 is about 5 mm to about 20 mm, for example, about 10 mm. Gap 140 provides clearance for tray 104 to move downward towards base 134 of support 130 as panel 114 deflects downward from a user pressing against panel 114, causing panel 114 to press against surface 122 of tray 104.

Tray 104 has a dimension 144 between a bottom surface 138 of tray 104 and surface 122 defining the openings of wells 106 of tray 104. In some embodiments, dimension 144 is greater than dimension 142 between flange 120 and panel 114 of cover 102 such that portion 146 of tray 104 extends beyond flange 120 in a direction away panel 114 and toward base 134 of support 130. Portion 146 of tray 104 can be used to register the proper alignment between cavity 132 of support 130 and tray 104 before tray 104 is decoupled from cover 102.

In some embodiments, cavity 132 of support 130 can be omitted. In such embodiments, cover 102 and tray 104 can be positioned above a surface of support 130, and then a force can be applied to panel 114 of cover 102 that overcomes the press fit between cover 102 and tray 104, decoupling tray 104 from cover 102. Tray 104 then drops onto the surface of support 130.

In some embodiments, assembly 100 is devoid of shrink-wrap and peelable film. In some embodiments, assembly 100 is devoid of a cardboard sleeve or box surrounding cover 102 and tray 104.

Cover 102 can be made of any suitable plastic. In some embodiments, cover 102 is made of any suitable plastic that can be thermoformed. In some thermoformed embodiments, cover 102 is made of polyethylene terephthalate glycol (PETG), amorphous or crystallized polyethylene terephthalate (PET), polyvinyl chloride (PVC), or polystyrene (PS). In some embodiments, cover 102 is made of an FDA compliant plastic.

In some embodiments, cover 102 includes an electrostatic dissipative (ESD) coating on at least the surfaces facing tray 104—the surfaces defining cavity 112. These surfaces include, for example, surface 128 of wall 116 and the cover surface adjacent to surface 122 of tray 104. The ESD coating can reduce the amount of static build up generated, for example, by the consumables moving within wells 106 of tray 104. Static build up can potentially cause cover 102 to stick to tray 104, preventing or making difficult the decoupling of cover 102 from tray 104.

In some embodiments, cover 102 has a thickness that provides sufficient rigidity to maintain engagement with tray 104, but the thickness is not too great, such that cover 102 is stiff and difficult to decouple from tray 104. For example, cover 102 can have a thickness in the range from about 10 mil to about 20 mil, such as 15 mil. In some embodiments, cover 102 has a thickness that allows cover 102 to be thermoformed without any voids in cover 102 being formed as the draws of cover 102 are formed.

In some embodiments, cover 102 is thermoformed. For example, cover 102 is made by heating a plastic sheet to a temperature at which the sheet is pliable and then forming the plastic sheet into the desired shape of cover 102 using a mold.

Tray 104 can be made of any suitable plastic. For example, tray 104 can be made of polypropylene (PP), polyethylene (PE), polystyrene (PS), polyester, or any other suitable plastic.

In some embodiments (not shown), cover 102 includes an RFID label to identify the consumable(s) contained in the wells 106 of tray 104.

Figure 6:
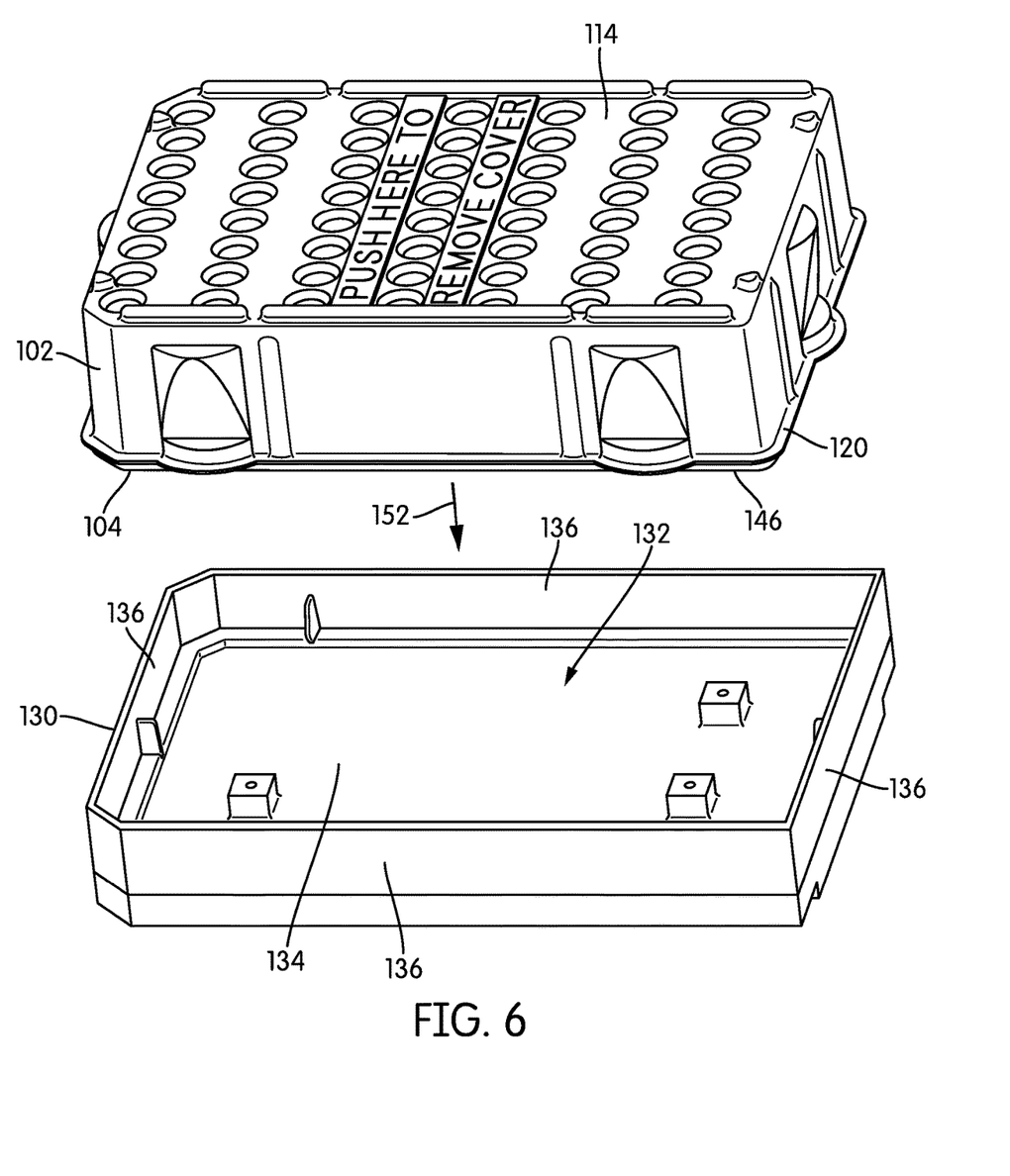
FIGS. 6-8 are perspective views an assembly having a cover and a tray being loaded onto a support at various steps, according to an embodiment.

Turning to methods of using assembly 100, assembly 100 can be used to load consumables into a sample processing instrument. In some embodiments, a loading method includes roughly aligning tray 104 with a desired location on support 130, for example, cavity 132 of support 130 or any desired surface of support 130. A user can hold assembly 100 by cover 102 using one hand, and then move assembly 100 such that portion 146 of tray 104 is roughly aligned with the desired location, for example, cavity 132 as shown in FIG. 6.

Figure 7:
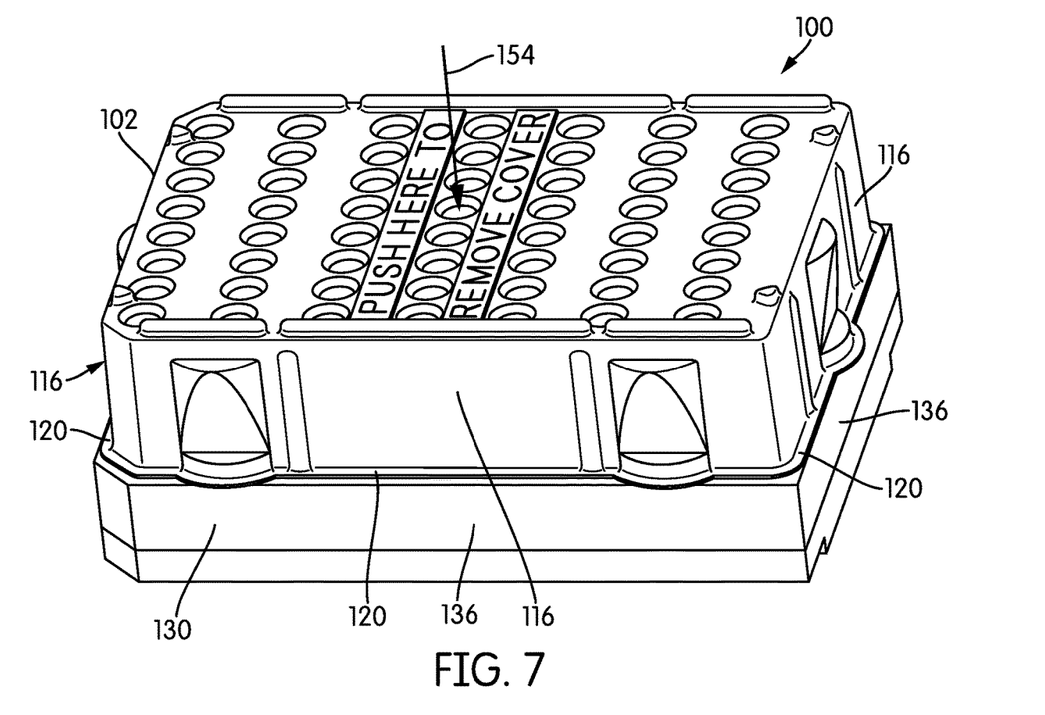

Next, the user can move assembly 100 in a direction 152 toward support 130. Portion 146 of tray 104 is inserted into cavity 132 of support 130, registering the proper alignment between tray 104 and cavity 132 until flange 120 contacts an upper surface of wall 136 of support 130, as shown in FIG. 7. And at this point, the bottom surface 138 of tray 104 is spaced apart from base 134 of support 130, as shown in FIG. 5. This step can also be accomplished by holding cover 102 with hand. In some embodiments in which support 130 does not include cavity 132 (not shown), the user can move assembly 100 in a direction 152 toward support 130, but leaving a space between bottom surface 138 of tray 104 and the desired surface location of support 130.

Figure 8:
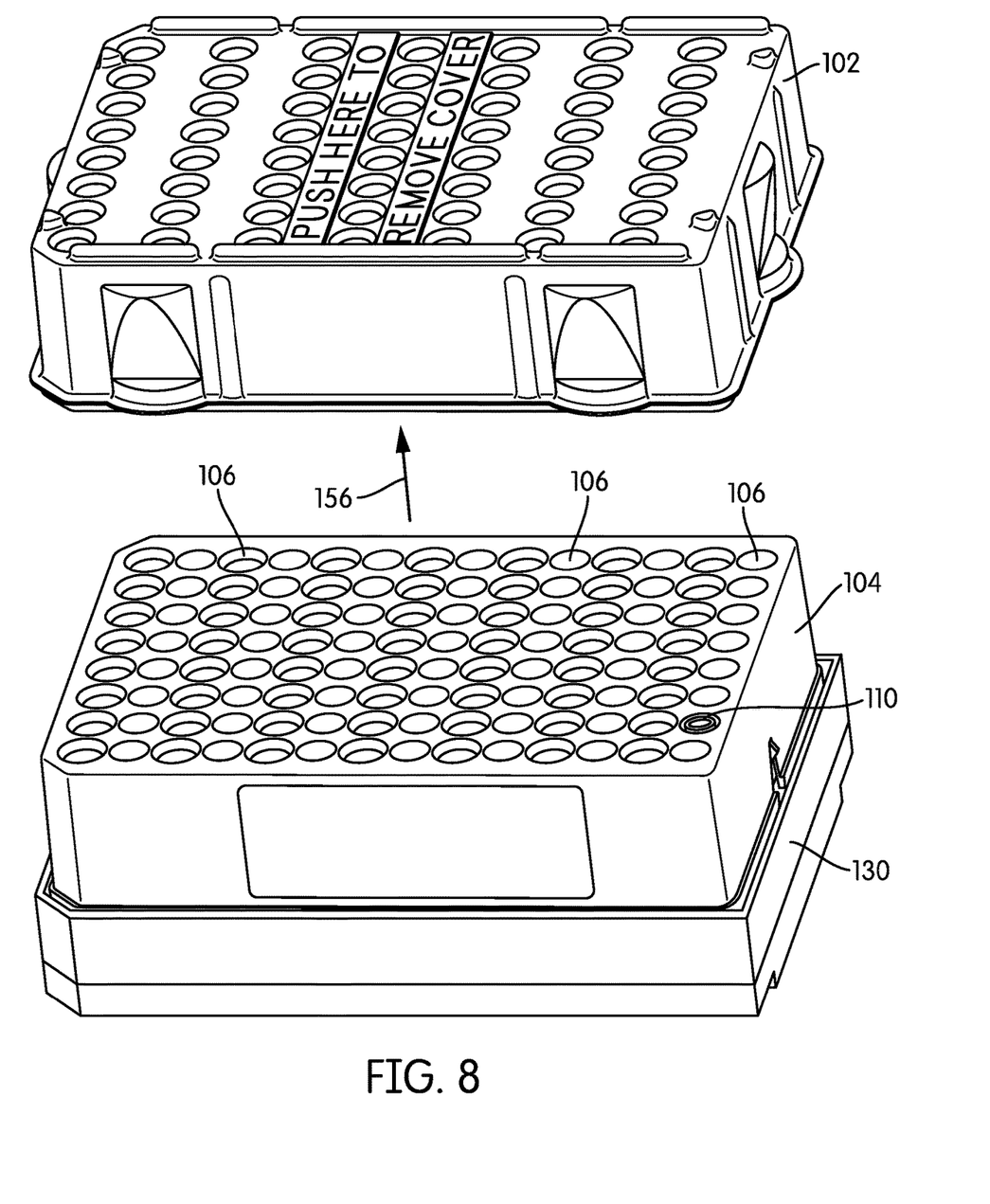

Next, a user can press down on panel 114 of cover 102 to apply a force 154 that overcomes the press fit formed between cover 102 and tray 104. In some embodiments, the user's finger(s), for example, the index finger and/or middle finger, can be used to apply force 154 to panel 114. As shown in FIG. 7, the user can press down on panel 114 such that force 154 is located at the substantially center of panel 114. As the user presses down on panel 114, panel 114 deflects downward pushing against surface 122 of tray 104. Because flange 120 is abutted against wall 136 of support 130, cover 102 does not move (other than deflection of panel 114) relative to support 130. Thus, applying force 154 overcomes the press fit between cover 102 and tray 104 and moves tray 104 relative to cover 102. In some embodiments, the magnitude of force 154 is in the range from about 3 N to about 11 N. Tray 104 then drops into cavity 132 of support 130 such that bottom surface 138 of tray 104 rests against base 134 of support 130. FIG. 8 illustrates tray 104 seated in cavity 132 of support 130 after tray 104 is decoupled from cover 102. In some embodiments, cover 102 is decoupled from tray 104 simultaneously with tray 104 being seated within cavity 132 of support 130.

Sensory feedback to the user can be generated when cover 102 is decoupled from tray 104. Exemplary sensory feedback includes tactile, audible, and visual feedback. In some embodiments, tactile feedback is generated by overcoming the press fit between cover 102 and tray 104. As the user presses down on panel 114 of cover 102, the user can feel the press fit between cover 102 and tray 104 being overcome, and can feel tray 104 seating with cavity 132 of support 130. In some embodiments, audible feedback is generated as panel 114 bends from the user pressing against panel 114. As panel 114 bends, panel 114 generates an audible noise that the user can hear. And in some embodiments, visual feedback is generated as cover 102 and tray 104 are decoupled. For example, cover 102 can be transparent such that the user can see the position of tray 104 relative to cover 102. As the user presses down on panel 114 of cover 102, the user can see the position of tray 104 relative to cover 102. Consequently, the user can see when tray 104 is decoupled from cover 102 and seated within cavity 132 of support 130.

In some embodiments as the user presses down on panel 114, walls 116 remain substantially stationary—walls 116 do not deflect relative to panel 114 (inward or outward).

After tray 104 is seated within cavity 132 of support 130, the user can move cover 102 in direction 156 to remove cover 102 from tray 104 and from the sample processing instrument. At this point, the sample processing instrument has access to the consumables contained within wells 106 of tray 104. In some embodiments, the sample processing instrument can then perform an assay for determining the presence of an analyte in a sample using the consumables contained within wells 106. In some embodiments, the sample processing instrument can then perform sample preparation steps using consumables contained within wells 106.

Notably, in some embodiments, the user can load tray 104 onto support 130 using just one hand and gripping only cover 102 (i.e., no direct contact between the user's hand and tray 104). In such embodiments, the user never has to touch tray 104 for loading tray onto support 130 or for decoupling cover 102 from tray 104. This can make loading consumables into the sample processing instrument easy and reduces the risk of contamination to the consumables contained within wells 106. This also reduces the amount of user handling required.

Although the above embodiments are described using cover 102 and tray 104 to store sample processing consumables, cover 102 and tray 104 can be used to store consumables or other removable items that are not sample processing consumables. For example, cover 102 and tray 104 can be used with other consumables or other removable items that are not intended to be used with sample processing instruments or that are intended to be used in outside of the laboratory or clinical environments.

While the present disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations are not intended to convey that the disclosure requires features or combinations of features other than those expressly recited in the claims. Accordingly, the present disclosure is deemed to include all modifications and variations encompassed within the spirit and scope of the following appended claims.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, and without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

While the invention has been described in connection with the above described embodiments, it is to be understood that the invention is not to be limited to the disclosed embodiments, but, on the contrary, is intended to cover various modifications and equivalent arrangements included within the spirit and scope of the appended claims.

All documents referred to herein are hereby incorporated by reference herein. No document, however, is admitted to be prior art to the claimed subject matter.

Furthermore, those of the appended claims which do not include language in the "means for performing a specified function" format permitted under 35 U.S.C. § 112, ¶ 6, are not intended to be interpreted under 35 U.S.C. § 112, ¶ 6, as being limited to the structure, material, or acts described in the present specification and their equivalents.

What is claimed is:

1. An assembly for storing sample processing consumables, comprising:
   a cover comprising a flexible panel and a cover wall extending downwardly from the perimeter of the panel, wherein the panel and the cover wall define a cover cavity; and
   a tray having a top surface defining a plurality of wells and a side surface extending downwardly from the perimeter of the top surface, wherein the panel is situated adjacent the top surface of the tray, wherein a first portion of the tray is received within the cover cavity such that a press fit is formed between the side surface of the tray and an inner surface of the cover wall, thereby releasably coupling the cover to the tray, wherein at least a portion of the plurality of wells contain a sample processing consumable,
   wherein the cover wall defines a hollow protrusion configured to prevent a vacuum from forming in the cover cavity when the first portion of the tray is received therein, and
   wherein the cover is configured to be decoupled from the tray by applying a force to the panel to overcome the press fit.

2. The assembly of claim 1, wherein the cover is configured such that the cover wall remains stationary as the cover is decoupled from the tray by applying the force to the panel.

3. The assembly of claim 1, wherein the cover further comprises a flange extending outward from the cover wall.

4. The assembly of claim 3, wherein the flange extends from a distal end of the cover wall.

5. The assembly of claim 3, wherein:
the cover wall has a cover dimension between the panel and the flange; and
the tray has a tray dimension between a bottom surface of the tray and the top surface of the tray, the tray dimension being greater than the cover dimension such that a second portion of the tray extends beyond the flange in a direction away from the panel.

6. The assembly of claim 1, wherein the plurality of wells comprise first and second subsets of wells, the first and second subsets of wells defining alternating, linear rows of wells, wherein the first subset of wells contains receptacles for performing nucleic acid-based assays, and wherein the second subset of wells contains caps for closing openings of the receptacles.

7. The assembly of claim 6, wherein the panel defines a plurality of protrusions, each of the protrusions defining a trough that extends into a portion of a corresponding well of the first subset of wells, and wherein the trough is situated adjacent a top portion of the receptacle in the corresponding well, thereby substantially preventing movement of the cap within the well.

8. The assembly of claim 1, wherein the cover is thermoformed.

9. The assembly of claim 1, wherein the cover can be decoupled from the tray by applying a force to the center of the panel in the range of about 3 N to about 11 N.

10. The assembly of claim 1, wherein a magnitude of the force applied to the panel to overcome the press fit is at least greater than a weight of the tray.

11. An assembly for storing sample processing consumables, comprising:
a cover comprising:
a flexible panel,
a cover wall extending downwardly from a perimeter of the panel, wherein the panel and the cover wall define a cover cavity, and
a flange extending outward from a distal end of the cover wall,
wherein the cover wall has a cover dimension defined between the panel and the flange; and
a tray comprising:
a top surface defining a plurality of wells, wherein at least a portion of the plurality of wells contain a sample processing consumable,
a side surface extending downwardly from a perimeter of the top surface, and
a bottom surface, wherein the tray has a tray dimension defined between the bottom surface and the top surface,
wherein a first portion of the tray is received within the cover cavity such that a press fit is formed between the side surface of the tray and an inner surface of the cover wall, thereby releasably coupling the cover to the tray and such that the panel is situated adjacent the top surface of the tray,
wherein the tray dimension is greater than the cover dimension such that a second portion of the tray extends beyond the flange in a direction away from the panel, and
wherein the cover is configured to be decoupled from the tray by applying a force to the panel to overcome the press fit.

12. The assembly of claim 11, wherein a magnitude of the force applied to the panel to overcome the press fit is at least greater than a weight of the tray.

13. The assembly of claim 11, wherein the panel and cover wall of the cover have a thickness in a range from 10 mil to 20 mil.

14. The assembly of claim 11, wherein the cover dimension is in a range from 20 mm to 40 mm.

15. The assembly of claim 11, wherein the cover wall defines a hollow protrusion configured to prevent a vacuum from forming in the cover cavity when the first portion of the tray is received therein.

16. The assembly of claim 11, wherein the second portion of the tray is configured to be received within a support cavity defined by a support of a sample processing instrument, and the flange of the cover is configured to contact a wall of the support when the second portion of the tray is received within the support cavity of the support.

17. The assembly of claim 11, wherein the tray comprises a plastic-based material.

18. The assembly of claim 11, wherein the tray comprises a stainless steel.

19. The assembly of claim 11, wherein the cover is thermoformed.

* * * * *

UNITED STATES PATENT AND TRADEMARK OFFICE
CERTIFICATE OF CORRECTION

PATENT NO. : 11,911,766 B2
APPLICATION NO. : 17/392208
DATED : February 27, 2024
INVENTOR(S) : Byron Knight It is certified that error appears in the above-identified patent and that said Letters Patent is hereby corrected as shown below:

On the Title Page

Item (54), in Title, in Column 1, Line 2, delete "PROCESSING" and insert -- PROCESSING CONSUMABLES --, therefor.

In the Specification

In Column 1, in Title, Line 2, delete "PROCESSING" and insert -- PROCESSING CONSUMABLES --, therefor.

In Column 3, Line 59, delete "is can" and insert -- can --, therefor.

In Column 4, Line 53, delete "views an" and insert -- views of an --, therefor.

In Column 5, Line 20, delete "capable" and insert -- capable of --, therefor.

In Column 5, Line 27, delete "capable" and insert -- capable of --, therefor.

In Column 7, Line 15, delete "106B can be" and insert -- 106B --, therefor.

In Column 7, Line 67, delete "which as" and insert -- which is --, therefor.

In Column 8, Line 52, delete "show" and insert -- shown --, therefor.

In Column 11, Line 20, delete "away" and insert -- away from --, therefor.

Signed and Sealed this
Fourteenth Day of May, 2024

Katherine Kelly Vidal
*Director of the United States Patent and Trademark Office*